Figure 1:
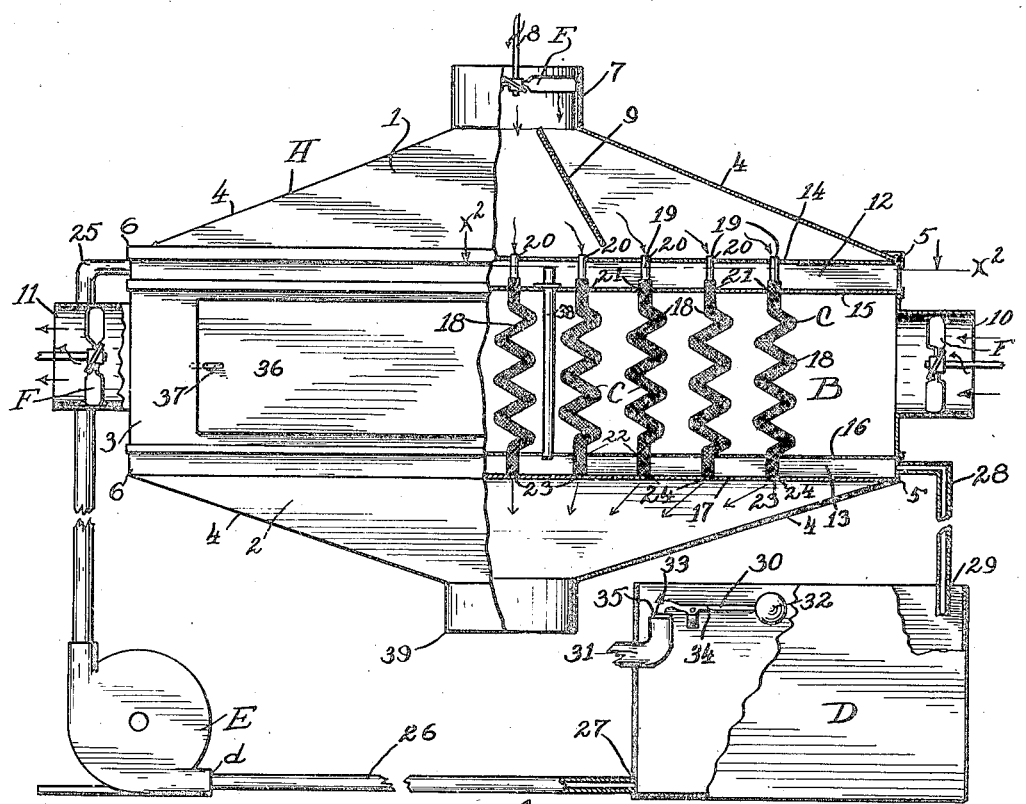

R. N. RICHARDSON.
AIR COOLER.
APPLICATION FILED FEB. 25, 1920.

1,428,661

Patented Sept. 12, 1922.

Inventor,
R. N. Richardson;
By Raymond Ives Blakeslee
Attorney.

Patented Sept. 12, 1922.

1,428,661

UNITED STATES PATENT OFFICE.

ROBERT N. RICHARDSON, OF LOS ANGELES, CALIFORNIA.

AIR COOLER.

Application filed February 25, 1920. Serial No. 361,140.

*To all whom it may concern:*

Be it known that I, ROBERT N. RICHARDSON, a citizen of the United States, residing at Los Angeles, in the county of Los Angeles and State of California, have invented new and useful Improvements in Air Coolers, of which the following is a specification.

This invention relates to air coolers, and more particularly to apparatus for cooling a current of air for purposes of health and ventilation, and not those involved in producing anæsthesia by cold, the manufacture of ice or the cooling of fruit and meat chambers.

In practicing the invention, I provide means for drawing air through a chamber in which there are disposed tubular members surrounded with fluid-absorptive material, which material is at all times saturated with water. Means are likewise provided for passing air through the tubular members. The air passing around the absorptive material tends, as fast as the molecules of water emerge from the liquid, to conduct the molecules away. It is a principle of physics that if heat is not applied to vaporize water, the evaporation of same is accompanied by a lowering of its temperature. Thus the tubular members are cooled and hence the air passing through same is likewise cooled and condensed, then becomes further cooled as it expands. The cooled air emerging from the members may be put to any use desired.

An object of this invention is to reduce to a moderate degree the passing volume of air which escapes and gives place to that which follows, and to at all times maintain a circulation of air so that the purity of the atmosphere in a chamber is retained.

A further object of the invention is the provision of an apparatus of the character stated which will be relatively simple and inexpensive in construction, when positiveness in operation is taken into consideration, which is capable of long continued use without need of repair or replacement, durability, and general efficiency and serviceability.

The invention consists in the novel and useful provision, construction, combination, relative arrangement, inter-relation and association of parts, members, features and elements, as well as the mode of operation of same,—all as developed in the specification and depicted in the drawing.

Figure 2:
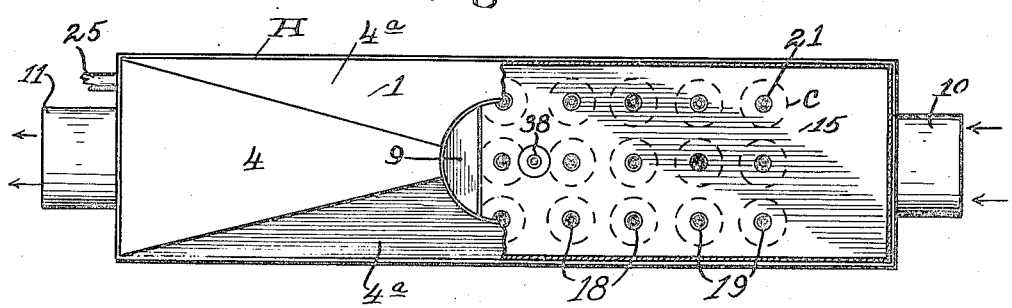

In the drawing:

Figure 1 is a fragmentary partly sectioned vertical elevation of the device; and Figure 2 is a fragmentary top plan view of the same shown in Fig. 1.

Corresponding parts in both of the figures are designated by the same reference characters.

Referring particularly to the drawing, A designates a housing, B a casing or conduit within said housing, C, tubular elements, D, a fluid supply tank, E, a centrifugal pump, and F, air blast fans; all of which elements are used in practicing one embodiment of my invention.

The housing A, while it may be made in any form, is preferably of the form shown in the drawing, and includes a top hood 1, a bottom hood 2, and a central portion 3, the interior of which accommodates the casing or conduit B.

The hoods 1 and 2 are each made with inclined walls 4 and 4ª which extend from end portions 5 and 6, constituting the end portions of the casing B, toward a common point. In form, each hood resembles the frustum of a regular pyramid. At what might be considered the imaginary apex of each hood there is disposed a conduit. The conduit 7, in hood 1, acts as an intake for air drawn into the hood by means of the air blast fan F. The fan F is mounted on a shaft 8, and when the shaft is turned by suitable means, the fan F forces a blast of air downwardly into the hood 1. To prevent the driven air from being directed in one direction only, distributors or deflectors 9 are mounted within the hood 1. This of course distributes the air to all parts of the interior of the hood 1. Regardless of whether or not a fan be used in the hood 2, deflectors are not necessary.

The casing B extends longitudinally of the housing A and is provided with an air inlet opening or conduit 10, and an outlet opening or conduit 11, within the mouths of which are disposed air blast fans F. These fans are so rotated that a blast of air is drawn through the casing B. Although it is not absolutely necessary, the casing B is preferably made in the form of a hollow rectangular parallelopiped.

Rigidly mounted both above and below the casing B and within the housing A are tanks 12 and 13 respectively, each of which has its upper and lower walls perforated, Inclinedly arranged in banks or in parallel or staggered formations, within the casing B, are the tubular elements C, which are shown as having two straight end portions 19 and 23 and a central portion $b$ in the form of a spiral helix. The end portions 19 and 23 of the elements C pass through the perforations in walls 14 and 15 of the tank 12, and walls 16 and 17 of the tank 13. The perforations 21 and 22 made in the walls 15 and 16 respectively, are in diameter greater than the diameter of the tubes of the tubular elements C, while the perforations 20 and 24 in the walls 14 and 17, respectively, form an air-tight fit with the peripheral surface of the end portions 19 and 23.

The tubular elements C have for a portion, a surface covering of fabric 18, which fabric loosely extends through the perforations 21 and 22 in the walls 15 and 16 respectively, and into the interior of the tanks 12 and 13. When the tanks 12 and 13 are filled with a fluid, the fabric 18 acts as an absorbent jacket or wick for the fluid.

Communicating with the lower tank 13 is a drain pipe 28 which joins to the supply tank D, as shown at 29. Within the supply tank D is means 30 for controlling the level of fluid contained therein; said means 30 includes a pivoted arm 34 having a ball float 32 mounted at one end of same, and a valve 33 at the other end. A pipe 31 communicates both with the interior of the tank D and the source of fluid supply, which in this case would be the water mains. The open end 35 of the pipe 31 is normally closed by the valve 33 when the tank D is filled with water, but if the fluid level in the tank D should be lowered, the valve would open and permit more fluid to enter. The means 30, shown, is of course, standard practice, and any other form of regulator or valve might be utilized.

A supply pipe 26 joins the centrifugal pump E at $d$ with the supply tank D as at 27. A further supply pipe 25 connects the opposite side of the centrifugal pump with the tank 12.

To facilitate communication with the interior of the casing B, a door 36 is provided on the longitudinal side of the housing A. The door is held in position by means of a sliding lock 37 attached to same and joined with the housing A.

The operation, uses and advantages are as follows:

When the centrifugal pump E is in operation and each of the fans F which are arranged in the inlet and outlet openings of the conduit, as well as the inlet opening of the hood, are likewise in operation, water is drawn from the tank D through the supply pipe 26, thence through the pump E and through the supply pipe 25 and into the tank 12. The water tends to fill the tank 12, and to prevent excessive pressure within the same, a drain pipe 38 is provided which extends between the upper tank 12 and the lower tank 13 to take care of any overflow. The absorptive jacket or wick 18 surrounding each of the tubular elements C immediately become saturated with water throughout their entire length, and meanwhile a blast of air is being drawn through the casing B by means of the fans F and tending to remove the molecules of water from each of the wicks 18. As shown in both Figures 1 and 2 the tubular elements are so arranged that the air circulating within the casing B is forced in and around each of the elements C, thus ensuring an equal distribution of the air curent. Meanwhile air is being forced through the tubular members C, and as shown by the arrows, into the bottom hood 2, and from thence through the outlet 39.

As previously described, it is impossible for any water to find its way into the interior of the tubular elements C. As the water is absorbed by the wicks 18 any excess of water is deposited in the lower tank 13, and the water in the tank 13 is conducted from same through the drain pipe 28 and back into the supply tank D. It will thus be seen that there is a continuous sequence of operation, the wicks being at all times saturated with water, and there is a continuous change or circulation of water.

It is obvious that many changes and modifications may be made in practicing the invention, all, however, without in any way departing from the general spirit of the same.

What I claim and desire to secure by Letters Patent is:

1. In an air cooling device, including a housing, a casing having an air inlet and outlet opening within said housing, a hood having an air inlet opening mounted above said casing, a hood having an air outlet opening mounted below said casing, liquid tanks mounted above and below the casing within the housing and covered by the base portions of the hoods, said tanks having their top and bottom walls perforated, tubular members within the casing, a portion of the upper ends of which passes through the perforations in the walls of the upper tank and communicates with the interior of the upper hood, while a portion of the lower ends of same passes through the perforations in the lower tank walls and communicates with the interior of the lower hood, means within the casing for forcing a stream of air therethrough, and means within the upper hood for drawing air within the same through the tubular members.

2. In an air cooling device, including a housing, a casing having an air inlet and outlet opening within said housing, a hood having an air inlet opening mounted above said casing, a hood having an air outlet opening mounted below said casing, liquid tanks mounted above and below the casing within the housing and covered by the base portions of the hoods, said tanks having their top and bottom walls perforated, tubular members within the casing, wicks covering a portion of the peripheral surface of the tubular members, a portion of the upper and lower ends of said tubular members passing through the perforations in the walls of the upper and lower tanks and communicating with the interior of the hoods, and a portion of the wicks passing through certain of the perforations and communicating with the interior part of the tanks, a supply pipe joining the upper tank, a drain pipe joining lower tank, a supply tank interposed between the supply pipe and drain pipe, a centrifugal pump adapted to circulate the liquid through the supply pipe, wicks and drain pipe, an air deflector or deflectors arranged within the upper hood and inclined toward said air inlet opening, and means within the upper hood and casing for forcing a stream of air through the casing and tubular members.

In testimony whereof, I have signed my name to this specification in the presence of two subscribing witnesses.

ROBERT N. RICHARDSON.

Witnesses:
 EDNA TURNER,
 J. SHUTT.